Aug. 11, 1931.                E. LANE                1,818,408
LAUNDRY TAGGING MACHINE
Filed Aug. 27, 1926            4 Sheets-Sheet 2
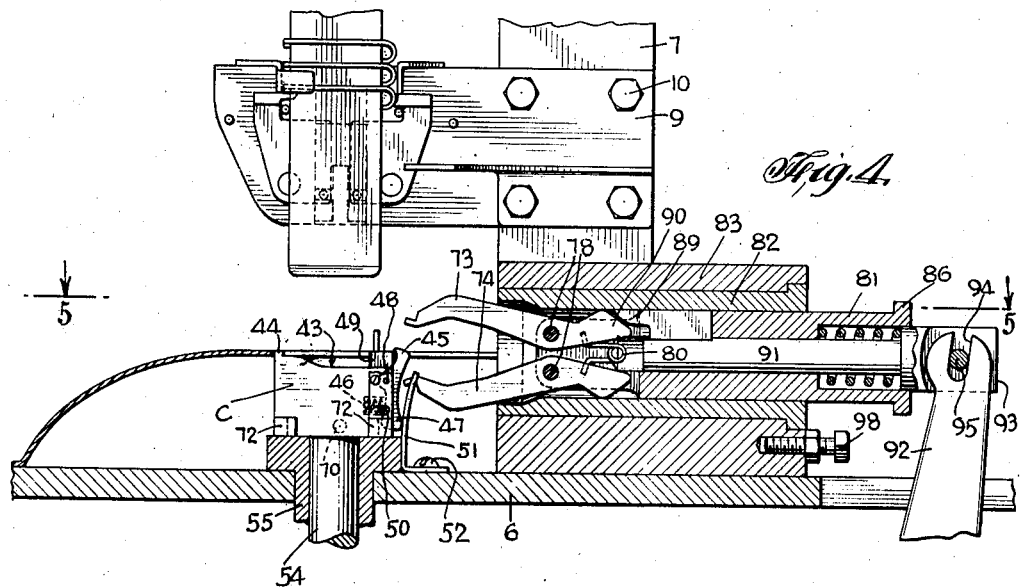
Fig. 4.
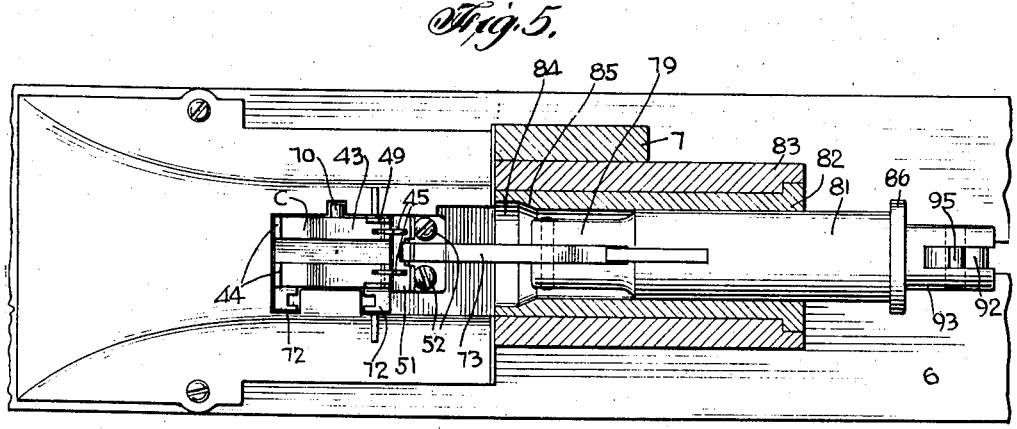
Fig. 5.
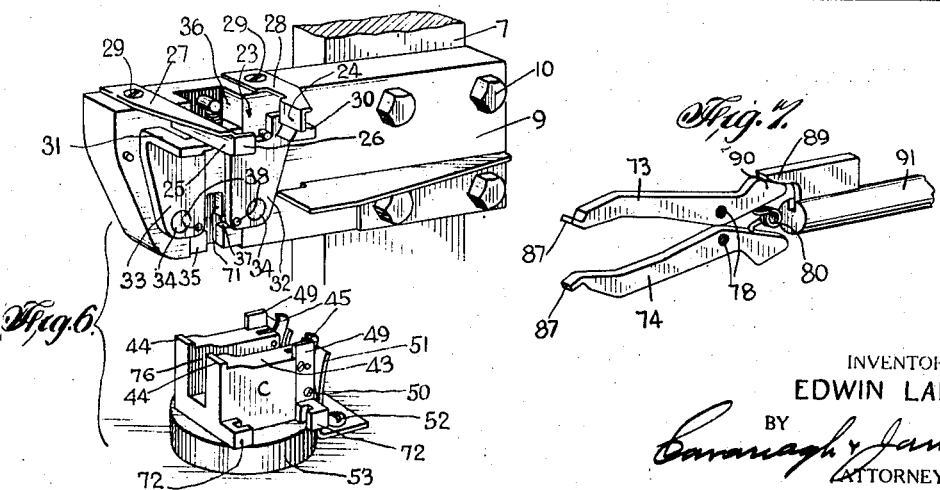
INVENTOR
EDWIN LANE
BY
Cavanagh & James
ATTORNEYS Aug. 11, 1931.   E. LANE   1,818,408
LAUNDRY TAGGING MACHINE
Filed Aug. 27, 1926   4 Sheets-Sheet 3

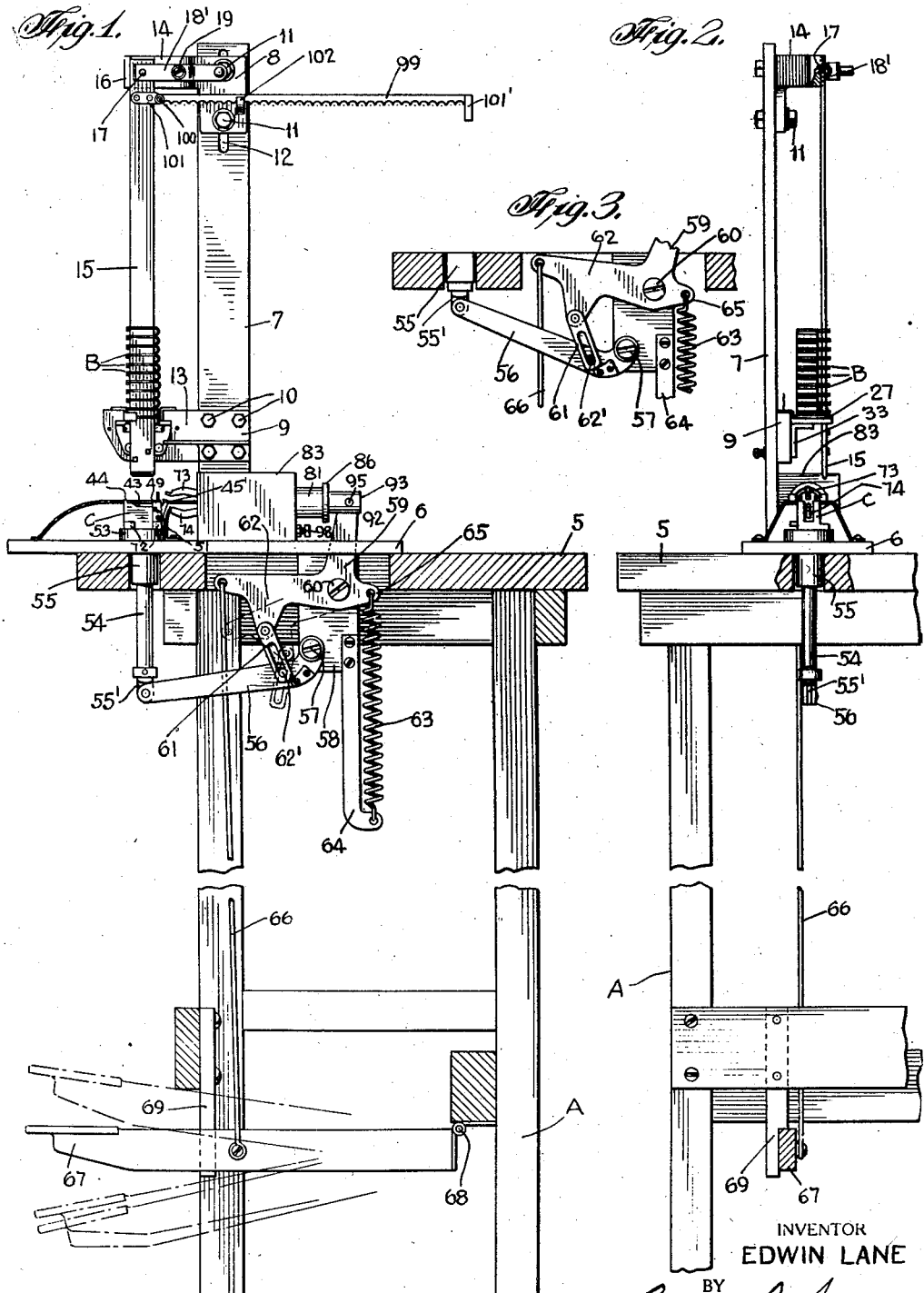

INVENTOR
EDWIN LANE
BY
Cavanagh & James
ATTORNEYS

Aug. 11, 1931.  E. LANE  1,818,408
LAUNDRY TAGGING MACHINE
Filed Aug. 27, 1926    4 Sheets-Sheet 4
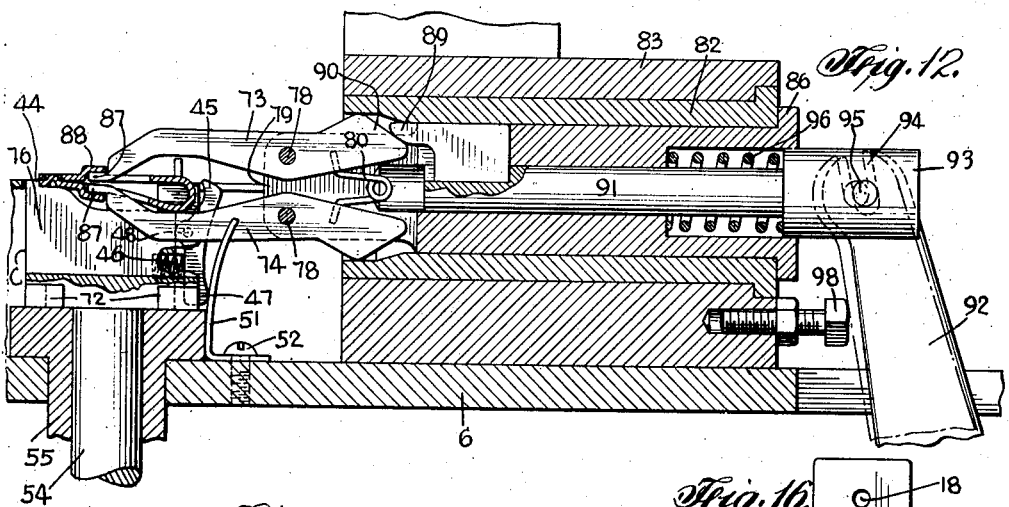
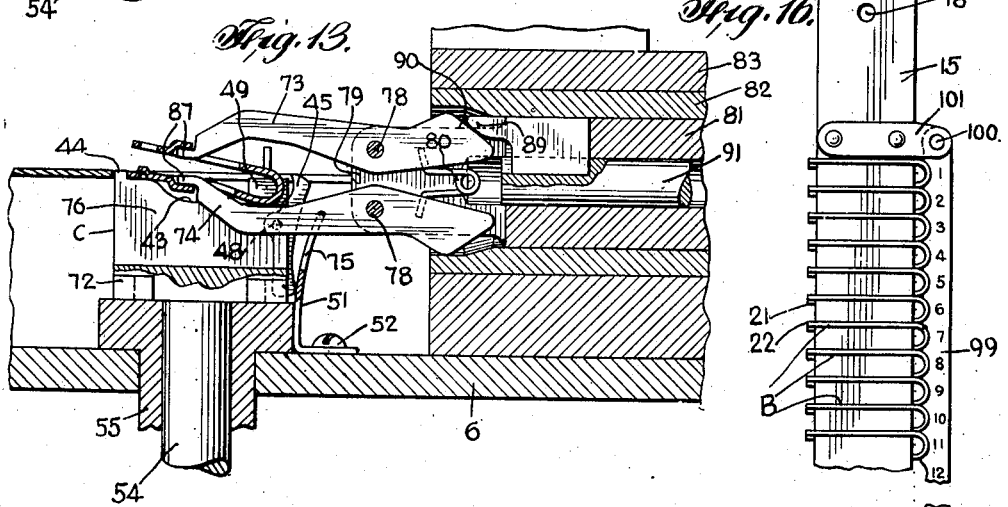
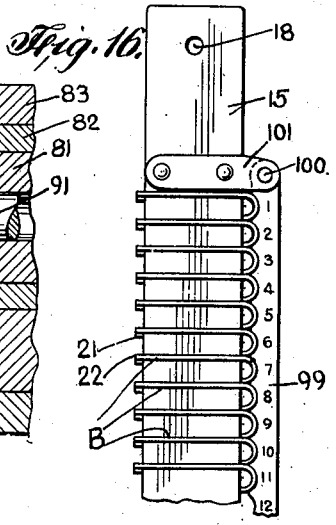
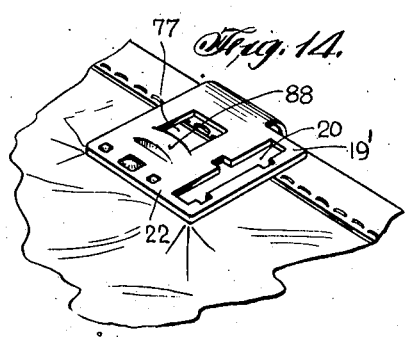
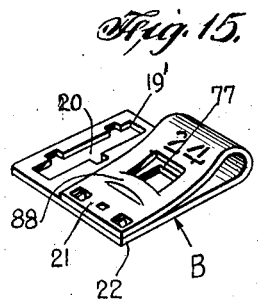
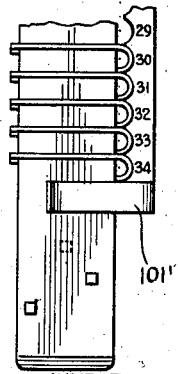
INVENTOR
EDWIN LANE
BY
ATTORNEYS Patented Aug. 11, 1931

1,818,408

UNITED STATES PATENT OFFICE

EDWIN LANE, OF NEW YORK, N. Y., ASSIGNOR TO CAROLYN LAUNDRY, OF NEW YORK, N. Y., A CORPORATION OF NEW YORK

LAUNDRY TAGGING MACHINE

Application filed August 27, 1926. Serial No. 131,865.

This invention relates to mechanism for affixing to and removing from articles of various sorts, identifying devices, such as tags, checks or clips, and has particular application to a machine of this character intended to be used in laundries, in the marking or identification of the various articles or goods undergoing the laundering process.

In the present instances I have shown a machine for affixing and removing tags, checks or clips of the character forming the subject matter of my co-pending application for laundry checking devices, filed April 24, 1925, Ser. No. 25,593, (Patent No. 1,621,259, dated March 15, 1927), although I wish it to be understood that this machine is not limited in its useful application to use in conjunction with laundry marking devices like those shown in said application.

However, I prefer to use a tag, check or clip of this type and which is shown in detail in Fig. 15 of the present drawings, for the reason that such a clip is so constructed that it may be readily affixed to and removed from the article to be laundered, and is inherently of such structure as to firmly grasp or clinch the goods, thereby ensuring that it will not be detached while the article is undergoing the laundering process, and passing through the washing machines and other laundering apparatus. At the same time such a clip is devoid of spurs, teeth, pins or other sharp projections which are liable to tear the goods, and to be detached when and if such goods are rent or torn adjacent the spurs or teeth of the tag clip.

In the present instance, it is my purpose to provide a machine through the medium of which tags or clips may be speedily, accurately, firmly and conveniently affixed to the articles to be laundered, and, when desired, subsequently removed therefrom.

It is also my purpose to provide a machine of this character which will embody the desired features of simplicity, efficiency, economy and durability, and which may be manufactured and marketed at a relatively low cost.

With the above recited objects and others of a similar nature in view my invention consists in the construction, combination and arrangement of parts set forth in and falling within the scope of the appended claims.

In the accompanying drawings

Fig. 1 is a view in side elevation of the machine embodying my invention, a portion of the supporting table or platform being shown in cross section.

Fig. 2 is a front view of the machine.

Fig. 3 is a fragmentary side elevation of the actuating mechanism for the tag receiving means.

Fig. 4 is an enlarged detail view, partly in section and partly in side elevation of the tag supporting and tag receiving means.

Fig. 5 is a horizontal section taken approximately on the line 5—5 of Fig. 4 and looking in the direction of the arrows.

Fig. 6 is a detailed perspective of the tag supporting and tag receiving means, arranged approximately in the position shown in Fig. 4.

Fig. 7 is a detailed perspective of the tag gripping fingers and a fragment of the operating device.

Fig. 12 is a view similar to Figs. 4 and 8 but showing positions of the tag gripping fingers when initially engaging a tag.

Fig. 13 is a view partly in vertical cross section and side elevation and showing the positions of the tag gripping fingers when operating to spread the jaws of a tag.

Fig. 14 is a perspective showing a fragment of a fabric together with a tag positioned thereon by the machine of this invention.

Fig. 15 is a detailed perspective of one of the tags or clips used in connection with the machine of the present invention.

Fig. 16 is an enlarged contracted detail side elevation of the magazine bar.

Referring now to the drawings:—

Figure 8:
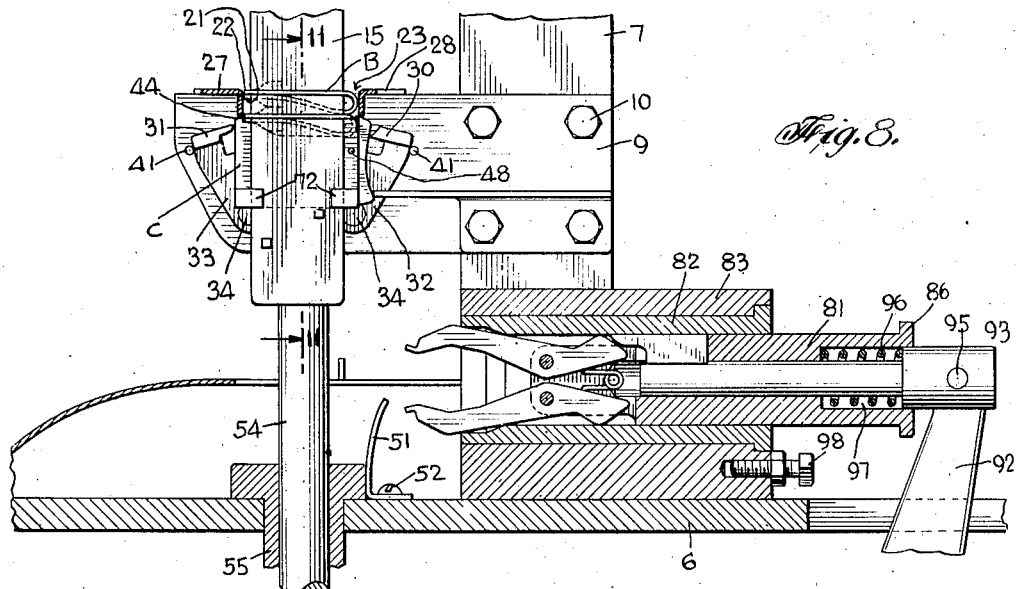
Fig. 8 is a view similar to Fig. 4 but showing positions of parts when the tag supporting means is operated to release a tag.

A indicates a suitable table to the top 5 of which is rigidly secured a base plate 6. A standard 7 is fixedly secured to the middle or other suitable portion of base plate 6 for supporting an upper bracket 8 and a lower bracket 9. The lower bracket 9 may be fixedly secured to standard 7 by means of screws 10 and the upper bracket 8 may be adjustably secured to standard 7 by set screws 11, operating in longitudinal slots 12. The lower bracket also has a laterally projecting end portion 13 in alignment with a lateral extension 14 of upper bracket 8; the adjustability of upper bracket 8 providing for giving a variation in the distance between extensions 13 and 14. A magazine rod 15 is adapted to be supported vertically by brackets 8 and 9. The upper end portion of said rod is arranged with its inner face, bearing upon extension 14 and its outer side upon a bent end portion 16 of extension 14. A locking pin 17 passes through a hole 18 in the upper end portion of the rod 15 and operates to support the rod in the vertical, as shown in Fig. 2. The pin is carried by one end portion of a resilient latch bar 18' which is pivotally connected to extension 14 as indicated by 19, so that when the engaging end of the latch is sprung outwardly to disengage pin 17 from bar 15, the latch may be readily turned to allow removal of the magazine rod.

Figure 9:
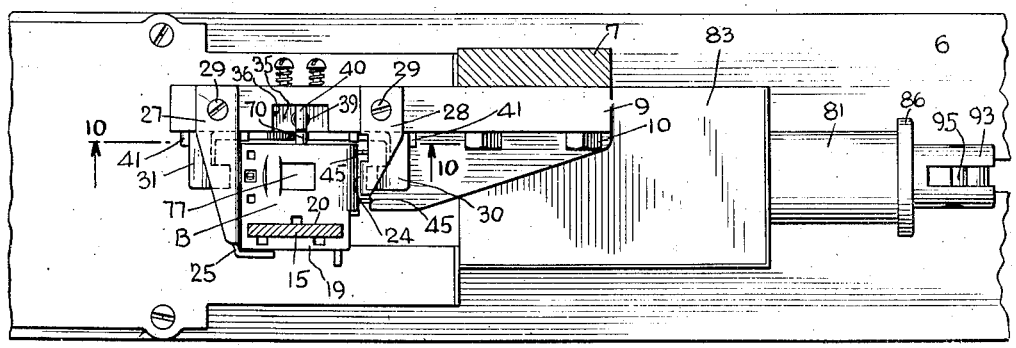
Fig. 9 is a plan view of Fig. 8.

The magazine rod 15 is adapted for confining one or a plurality of tags or clips of the type shown in Fig. 15 and indicated by B. In Figs. 1, 2 and 16 a plurality of the clips B are shown as being strung upon rod 15, each of the clips having a lateral extension 19, provided with an oblong opening 20, through which rod 15, loosely passes. The tags B are arranged upon rod 15 in inverted position with respect to the position illustrated in Fig. 15 and the free ends of jaws 21 and 22 are disposed so as to extend away from standard 7. The lowermost tag upon the rod is disposed within an open ended guide 23, disposed laterally of and adjacent to the free end of lower bracket arm 13. The guide 23 is further disposed so that the lower end portion of magazine arm 15 extends therethrough. The lowermost tag extends between the downwardly extending side portions 24 and 25 of the guide which prevents endwise displacement of the tag and extension 26 at the outer end of extension 25 operates to prevent outward lateral displacement of the tag; the portions 24, 25 and 26 incidentally operate through the medium of the lowermost tag to prevent vibration of the magazine rod in the operation of the device. The side walls 24 and 25 in reality form down-turn extensions of two plates, 27 and 28, which are rigidly secured to the upper side of lower bracket arm 15 as by screws 29. As shown in Figs. 6 and 9, plate 27 is longer than plate 28 so that a clearance is provided beyond the outer end of the shorter plate 28 to permit the ready removal and insertion of magazine rod 15.

Figure 10:
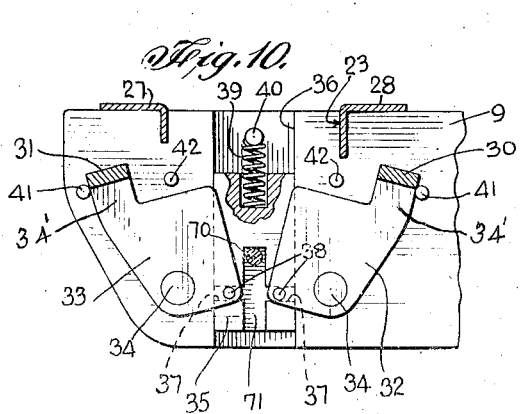
Fig. 10 is a detail vertical cross section of the tag supporting mechanism and taken approximately on the line 10—10 of Fig. 9.

The lowermost tag within guide 23 bears directly upon the lips 30 and 31 of the tag supporting or receiving jaws 32 and 33. The said lips are disposed underneath the side portions 24 and 25 and are arranged one opposite the other as clearly shown in Figs. 4, 6, 8 and 9. The body portions of jaws 32 and 33 are disposed upright and in spaced relation and are arranged adjacent to the lower bracket arm to which they are pivotally connected (at their lower end portions) as indicated by 34. Relatively short and narrow necks 34' connect the upper end portions of jaws 32 and 33 with lips 30 and 31 (Fig. 10). A block or draw-head 35 is disposed for sliding movement in a vertical transverse recess 36 located in lower bracket arm 9 and directly behind the adjacent sides of jaw members 32 and 33, as clearly shown in Figs. 4, 6 and 10. Horizontally disposed recesses 37 in block 35 receive inwardly projecting pins 38 at the lower inner corner portions of the jaws so that when block 35 is reciprocated in recess 36 the jaws are rocked inwardly and outwardly and the lips 30 and 31 move into and out of the space within guide 23. In this way and when the lips are moved outwardly from the guide the lowermost tag is released and the succeeding tag engaged and supported by the lips when these move inwardly. In moving upwardly within recess 36 to open jaws 32 and 33, block 35 operates to tension a compression spring 39 disposed within a socket in the upper end of the block and secured to a wall of the recess 36 as indicated in 40. The jaws 32 and 33 are limited to move outwardly and inwardly by stop pins 41 and 42 secured to the lower bracket arm 9 and located so as to intercept the jaws in their movements.

The head C of the tag receiving mechanism is located below guideway 23 and in vertical alignment therewith. Normally head C is in spaced relation to the guideway 23 as shown in Fig. 1 in order to permit the insertion of an object, such as an item to be laundered therebetween. The head C is adapted to be raised into contact with the lowermost tag B upon magazine rod 15 and the upper end surface 43 of the head is sloped to conform to the slope of the adjacent surface of the jaw 22 of the tag so that the head will support the tag with jaw 21 thereof in the horizontal, or substantially so. The upstanding portions 44 are provided on opposite corners at one end of the surface 43 to function as stops for engaging the free ends of the jaws 21 and 22 and thereby prevent endwise movement of the tags in one direction when the tag is supported by head C. A pair of vertically disposed hooks 45 are set into vertical recesses in the end of head C remote from stops 44. The bills of these hooks are caused to normally overhang the surface 43 by springs, one of which is shown in Figs. 4 and 12 and indicated by 46, the said springs being set into sockets in head C so as to press outwardly upon the shanks or the lower end portion 47 of the hooks. The hooks are pivotally mounted, as indicated by 48 and their bills are so disposed and adapted as to overlie the connected end portions of jaws 21 and 22 when surface 43 is raised into contact with the lowermost tag upon rod 15. In this way the hooks 45 cooperate with stops 44 to confine the lowermost tag against accidental displacement from the head, such accidental displacement being further prevented by the presence of the supplemental stops 49 arranged adjacent to hooks 45 and secured to the head in any preferred manner such as indicated by 50. When head C moves from its elevated position shown in Fig. 8 to its lower position, as shown in Figs. 4 and 12, the projecting end portions of shanks 47 move into contact with the surface of an upstanding curved deflector plate 51 which operates to rock the hooks so that the bills thereof disengage from the connected ends of jaws 21 and 22 of the tag when the head C finally occupies its lowered position. The deflector plate 51 is suitably secured to the base plate 6 as by screws 52.

The base 53 of head B is fixedly secured to the upper end of a vertically disposed plunger 54 which is mounted to slide vertically in a bushing 55 set into aligning openings in top 5 and base plate 6, as shown in Fig. 1. A link connection 55' is provided between the lower end of plunger 54 and one end of a rock-arm 56 which is pivotally connected as at 57 to a hanger 58 disposed below base plate 6. The hanger 58 may form a support for a bell-crank lever 59 which is mounted for a vertical turning movement as indicated by 60. A slotted link 61 provides a connection between the arm 62 of bell-crank 59 and rock-arm 56. A stud 62' on rock-arm 56 extends through the slotted link 61 and by bearing on the lower end thereof, operates to move rock-arm 56 upwardly when arm 62 of the bell-crank lever moves upwardly. Bell-crank lever 59 is operated to move arm 62 thereof upwardly by a retractile spring 63 which is connected to an extension 64 of hanger 58 and to an elbow 65 of bell-crank 59. Spring 63 is held tensioned by suitable mechanism adapted for connection to any suitable portion of bell-crank 59 so as to hold arm 62 thereof in a position to release the spring 63. This mechanism may be capable of being operated by mechanical power and constructed so as to release the bell-crank 59 at required intervals to enable spring 63 to rock the bell-crank 59 and thereby elevate head C into contact with the lowermost tag on rod 15. In the present instance I have shown a connecting rod 66 as arranged for transmitting motion from a treadle 67 to bell-crank 59. This treadle is pivotally connected as at 68 to the lower portion of table A and its free end portion is movable into and out of engagement with a keeper 69 also connected to the lower end portion of table A, as shown in Figs. 1 and 2. The keeper operates to hold treadle 67 against upward movement which occurs when the treadle is disengaged from the keeper, the spring 63 having sufficient power when tensioned to elevate the treadle and rock the bell-crank together with the parts connected thereto.

Figure 11:
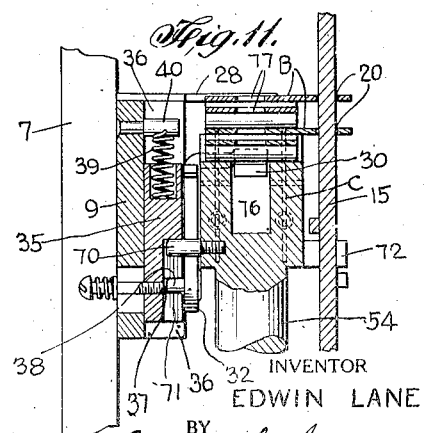
Fig. 11 is a vertical cross section taken approximately on the line 11—11 of Fig. 8 and looking in the direction of the arrows.

In the upward movement of head C a pin 70 carried thereby and as shown in Figs. 10 and 11, enters a vertically disposed recess 71 in block 35 and thereby operates when abutting the upper inner end of said recess to slide block 35 upwardly and rock jaws 32 and 33 outwardly to release the lowermost tag upon rod 15. When the outward movement of jaws 32 and 33 ceases under action of the stops 41, the upward movement of head C also ceases. At this time the bills of hooks 45 engage around the connected ends of jaws 21 and 22 of the lowermost tag so that the latter is held wholly within the socket provided by the upper face structure 43 of head C. When the treadle 67 is depressed from the upper dotted line position in Fig. 1 and into the full line position, such movement on the part of the treadle operates to lower the head C and tension spring 63. Block 35 then moves downwardly with head C and operates to rock jaws 32 and 33 inwardly in order to position the lips 30 and 31 to engage between the tag held by head C and the next succeeding tag. In this way the last named tag is held from downward movement with the head until the occurrence of a succeeding upward movement of head C.

Referring to Figs. 6 and 8, 72 indicates a pair of oppositely disposed recessed lugs on head C, which are adapted for engaging the opposite side portions of magazine rod 15 in the upward movement of the head in order to additionally prevent displacement of the magazine rod in the operation of disengaging the lower-most tag.

When the head C is lowered and the tag thereon in the position shown in Fig. 12, the resilient jaws 21 and 22 are spread apart by action of a pair of fingers 73 and 74. These fingers are normally retracted from the path of up and down movements of head C, as shown in Fig. 4. In this position it is to be noted that the outer ends of the fingers are spread apart so as to provide a clearance for the intervening tag when the fingers are projected into the position shown in Fig. 12. In moving into the last named position the lower finger 74 passes through a recess 75 in the deflector plate 51 and through a vertical transverse recess 76 in head C and opening through the upper face 43 thereof. The centrally disposed openings 77 in jaws 21 and 22 of the tag over-lie recess 76 when tag B is positioned upon head C. The openings 77 are adapted for receiving the outer terminals of fingers 73 and 74 when these are operated to close, as shown in Fig. 12. It will be noted that the adjacent sides of the fingers 73 and 74 are cut away so as to provide a clearance for the connected end portions of the jaws of tag B when the outer terminals of the fingers are within the openings 77. Fingers 73 and 74 are mounted upon horizontally disposed pivot pins 78, arranged one above the other and secured within a recessed head 79 in the recess of which the fingers 73 and 74 are disposed. A hairpin spring 80 has its end portion secured to the inner end portions of fingers 73 and 74 and operates normally to spread apart the inner end portions of the fingers and thereby cause the outer end portions of said fingers to close automatically. Head 79 forms one end portion of a sleeve 81 which is slidable in a bearing 82 secured within a horizontally disposed housing 83, carried by base plate 6 and disposed along one side and at the lower end portion of standard 7. The end portion of bearing 82, adjacent to head C, is counter-bored as at 84 and bevelled as at 85. When sleeve 81 is moved so as to project fingers 73 and 74 the inner end portions of the fingers move into the counter-bored end portion of the bearing 82 so that the spring 80 may operate to spread apart the inner end portions of the fingers and thereby cause the outer free end portions of the fingers to close. This action takes place when the fingers are in alignment with openings 77 of the tag and prior to that time the free outer end portions of the fingers are spread because the diameter of the bearing inwardly beyond the counter-bored portion thereof is such as to permit of a small degree of spreading on the part of the inner ends of the fingers 73 and 74.

The sliding movement of the sleeve is limited in one direction by a stop collar 86 on the end of the sleeve remote from the counter-bored portion thereof. This collar is adapted to abut the bearing 82 when the fingers are fully projected, the bearing 82 being fixedly secure within the housing 83. It is to be noted that the terminal outer end portions 87 of fingers 73 and 74 are parallel and bear one upon the other when the fingers enter openings 77 of the tag. These terminal portions 87 are adapted to enter the sockets or depressions 88 on the inner faces of jaws 21 and 22 and located beyond the outer sides of openings 77. When these terminal portions 87 enter sockets 88, stop-ring 86 prevents further longitudinal movement of the fingers and the fingers are wholly projected and occupy the position shown in Fig. 12. Referring now to Fig. 13, it is to be noted that the terminal portions 87 of the fingers are spread apart and the free ends of jaws 21 and 22 of the tag are also spread, thus providing a clearance between the jaws 21 and 22 for the insertion of an item to be laundered or the like. The spreading apart of the terminal portions 87, as shown in Fig. 13, is effected by the wedging action of a bevelled lug 89, operating on the bevelled inner end of portion 90 of one of the fingers as, for instance, the finger 73. The lug is rigidly secured to a plunger 91 which is slidable in sleeve 81, the lug 89 being slidable in a recess in the sleeve. An arm 92 of the bell-crank 59 extends upwardly through aligning recesses in the top 5 and base plate 6, its upper end portion extending into a recess formed in the head 93 on the end of the plunger 91 remote from the lug 89. Slot 94 in the upper end portion of arm 92 receives a transversely disposed pin 95, arranged within the recess of head 93. Head 93 projects beyond the housing 83 and when arm 92 operates to move head 93 inwardly and toward the sleeve 81, the movement of head 93 is transmitted to sleeve 81 by a compression spring 96 disposed within a socket 97 in the sleeve and surrounding the plunger rod and bearing on the head 93 and inner end of the socket. The sleeve when positioned, as shown in Fig. 8 is responsive to movement of arm 92 until the stop-ring abuts the bearing, as shown in Fig. 8, whereupon, further movement of arm 92 operates to move plunger 91 against the action of the spring 96. This action on the part of the plunger has the effect of operating lug 89 to spread the fingers 73 and 74 and open the jaws of tag B. When arm 92 moves from the position shown in Fig. 12 to that shown in Fig. 8, lug 89 by engaging with sleeve 81 operates to move the sleeve to the position shown in Figs. 4, 5, 8 and 9 and thereby effect the withdrawal of fingers 73 and 74 from the head C.

It is to be noted, by reference to Fig. 1, that treadle 67 is movable downwardly and away from keeper 69 and into the lower dotted line position shown in Fig. 1. In moving to the last named position arm 62 of the bell-crank is caused to turn downwardly from the position shown in Fig. 1, whereupon, arm 92 of the bell-crank moves towards the housing and operates plunger 91 and the parts connected thereto. It is to be further noted however that this last described movement on the part of the bell-crank has no effect upon the rock-arm 56 and head C connected thereto, it being obvious that when the bell-crank moves to the dotted line position in Fig. 1, link 61, by virtue of its slot, passes downwardly and over stud 62'.

In the practical use of the present device the treadle 67 is disengaged from keeper 69 and allowed to move into the upper dotted line position, whereupon a tag is received from the magazine rod 15 by head C. The treadle may then be depressed to the lower dotted line position in Fig. 1, whereupon the jaws of the tag are spread to permit insertion therebetween of a fabric such as shown in Fig. 14, after which the treadle is permitted to engage with keeper 69. When the treadle is in the last named position the fingers are retracted from the tag and the tag, by virtue of its inherent resiliency engages the fabric and becomes secured thereto as shown in Fig. 14. When the fingers are positioned as shown in Fig. 12, treadle 67 is in the intermediate dotted line position shown in Fig. 1.

Now it is obvious that tag B, engaged as shown in Fig. 12, may be one removed from the magazine rod 15 or a tag such as shown in Fig. 14 affixed to a fabric and previously arranged upon head C when the parts were positioned, as shown in Fig. 1. In the last named instance the said tag may be readily detached from the fabric by moving the treadle to the lowermost dotted line position in Fig. 1 in order to separate the jaws of the tag as shown in Fig. 3 and thereby leave the fabric free to be withdrawn from between the jaws by the operator.

An adjustable stop in the form of a set screw 98 is screwed into the housing 83 and located in the path of movement of arm 92 of the bell-crank lever in order to limit movement of arm 92 to the left in Fig. 12.

The practical use of the present invention in connection with the laundry industry contemplates the employment of a plurality of magazine rods 15 and the assignment of different identification characters to the various customers of a laundry. When the items of laundry of any particular customer are to be tagged a number of tags shown in Fig. 15 and each having the identification number of the customer are strung upon a magazine rod 15, as shown in Fig. 16. The magazine rod is then placed into the machine, as previously described and the tags are successively applied to the items to be laundered.

As a refinement to the foregoing procedure, it is proposed to arrange a definite number of tags upon each rod and to readily indicate the number of tags removed therefrom in the operation of marking the pieces of a customer's laundry in order to facilitate the accuracy in checking off the number of pieces received from such customer.

In this connection, each rod may be provided with an arm 99, pivotally connected as at 100 to a bracket 101 at the upper end portion of the rod, the bracket being so disposed as to permit rod 99 to be arranged parallel with one of the longitudinal sides of the rod.

The spaces upon a face of the rod are numbered in ascending series from the upper to the lower ends of the rod and these spaces are disposed opposite to detents in one side arm 99 which detents are adapted for receiving the rounded connected end portions of the jaws 21 and 22. The lower end of arm 99 may have an inturned extension 101' which, when the arm is parallel with rod 15, operates to support a string of tags as shown.

When the construction just described is to be arranged in the machine of this invention, arm 99 is moved upwardly and outwardly after rod 15 is secured to the upper bracket arm 14 and subsequently arm 99 is moved so as to engage the lug 102 upon bracket 8 which operates to support arm 99 in the position shown in drawing. After the operation of marking the various pieces of laundry of one customer the rod 15 is detached and arm 99 swung downwardly into its initial position, whereupon the number of tags employed in marking the pieces of laundry may be readily determined from observation of the numbered area of the arm.

In using clips of the character shown in Fig. 15, so far as I am aware, such clips have hitherto been applied by means of a hand tool, and I believe myself to be the first to have devised the machine for applying and removing the clips, thus accomplishing great saving of time, labor and expense.

While I have herein shown and described one particular embodiment of my invention, I wish it to be understood that I do not confine myself to all the precise details herein set forth by way of illustration, as modification and variation may be made without departing from the spirit of the invention or exceeding the scope of the appended claims.

What I claim is:

1. In a machine of the class described a tag supplying magazine, devices located adjacent thereto and including movable jaws for supporting individual tags supplied from the magazine, tag receiving means movable into position to open the jaws and to receive individual tags therefrom, and tag applying mechanism associated with the tag receiving means for applying a tag held by said receiving means to an article to be identified.

2. In a machine of the class described an upright magazine, devices located adjacent thereto for supporting individual tags supplied from the magazine by gravity, tag receiving means including a movable head for removing individual tags from the tag supporting devices, gripping mechanism associated with the tag receiving means, and means for operating the gripping mechanism to open a tag on the tag supporting means and to apply the same to an article to be identified.

3. In a machine of the class described, a tag supplying magazine for holding a plurality of U shaped identifying tags of resilient material, devices located adjacent thereto for supporting individual tags supplied from the magazine, a tag receiving means including a movable plunger having a tag receiving member for removing individual tags from the tag supporting devices, and tag applying mechanism including a pair of gripping jaws associated with the tag receiving means for gripping a tag, opening the same and applying it to an article to be identified.

4. In a machine of the class described a tag supplying magazine including a bar adapted to have a plurality of tags strung thereon, devices located adjacent the bar for supporting tags received one at a time from the magazine bar, tag receiving means for removing individual tags from tag supporting devices, and means associated with tag receiving means for gripping the tag and applying the same to an article to be identified.

5. In a machine of the class described an upright tag supporting magazine bar carrying a supply of identifying tags, means for removably supporting the said bar in fixed position, and locking means for engaging and releasing under gravity the tags from the bar successively at predetermined times.

6. In a machine of the class described an upright magazine bar adapted to have a plurality of tags strung thereon, tag supporting devices located adjacent thereto, and means for clamping the magazine bar in fixed position relative to the tag supporting devices to supply individual tags to the latter by gravity.

7. In a machine of the class described a tag supplying magazine, devices for supporting individual tags received from the magazine, tag receiving means including a vertically movable head for removing individual tags from the tag supporting device, mechanism, including a pair of laterally movable gripping members, associated with the tag receiving means for gripping the tag and applying the same to an article to be identified, and means for moving the gripping members and the tag receiving head at predetermined times.

8. In a machine of the class described a tag receiving means for supporting individual clamp-like tags, and tag applying means associated therewith for opening a tag held by the tag receiving means and then releasing the tag to allow the same to clamp upon an article to be identified.

9. In a machine of the class described the combination of tag receiving means for supporting individual identifying tags, gripping members movable at an angle to the tag receiving means to apply a tag to an article to be identified and means for opening and closing the tag gripping members.

10. In a machine of the class described an upright magazine, movable devices located below said magazine for receiving and supporting individual tags supplied from the magazine by gravity, and tag receiving means adapted to actuate the tag supporting devices to release an individual tag supported thereby.

11. In a machine of the class described an upright magazine, movable devices located adjacent thereto for supporting individual tags supplied from the magazine by gravity, and tag receiving means adapted to actuate the tag supporting devices to release an individual tag supported thereby, said tag receiving means being further adapted to grip a tag held thereby at a plurality of points.

12. In a machine of the class described an upright magazine, relatively movable devices located below said magazine for receiving and supporting individual tags supplied from the magazine by gravity, and tag receiving means adapted to actuate the relatively movable tag supporting devices to release an individual tag supported thereby.

13. In a machine of the class described an upright magazine, movable devices located adjacent thereto for supporting individual tags supplied from the magazine by gravity, and tag receiving means adapted to actuate the tag supporting devices to release an individual tag supported thereby, and gripping members associated with the tag receiving means adapted for gripping a tag held thereby at a plurality of points.

14. In a machine of the class described an upright magazine, movable devices located adjacent thereto for supporting individual tags supplied from the magazine by gravity, and tag receiving means adapted to actuate the tag supporting devices to release an individual tag supported thereby, and gripping members associated with the tag receiving means adapted for gripping a tag held thereby at a plurality of points, and means for operating said gripping members to release the tag at predetermined times.

15. In a machine of the class described an upright magazine, movable devices located adjacent thereto for supporting individual tags supplied from the magazine by gravity, and tag receiving means adapted to actuate the tag supporting devices to release an individual tag supported thereby, and spring actuated gripping members associated with the tag receiving means adapted for gripping a tag held thereby, and means for operating said gripping members to release the tag at predetermined times.

16. In a machine of the class described the combination of tag receiving means for supporting individual clamp like tags and tag applying means for engaging and opening a tag held by the tag receiving means and for releasing the tag to allow the same to clamp upon an article to be identified.

17. In a machine of the class described the combination of tag receiving means for supporting individual self clamping tags, and tag applying means movable in one direction for engaging and opening a tag held by the tag receiving means, and movable in another direction for releasing the tag to allow the same to clamp upon an article to be identified.

18. In a machine of the class described the combination of tag receiving means for supporting individual self clamping tags, and tag applying means having relatively movable parts for engaging and opening a tag held by the tag receiving means and for releasing the tag to allow the same to clamp upon an article to be identified.

19. In a machine of the class described, an upright tag supplying magazine, devices located adjacent thereto for supporting individual tags supplied from the magazine by gravity, said tags being individually preformed so as to be applied to an article, tag receiving means for removing individual tags from the tag supporting devices, and mechanism associated with the tag receiving means for gripping and opening the tag and applying the same to an article to be identified.

20. In a machine of the class described, an upright tag supplying magazine, devices located adjacent thereto for supporting individual tags supplied from the magazine by gravity, said tags being individually preformed so as to be applied to an article, tag receiving means movable into position to release and receive individual tags from the tag supporting devices, and mechanism movable into position with respect to the tag supporting devices to grip and open the tag and apply the same to an article to be identified.

21. In a machine of the class described, an upright tag supplying magazine, tag supporting members located adjacent the magazine, and movable to support individual tags supplied from the magazine by gravity, said tags being individually pre-formed so as to be applied to an article, tag receiving members operable to release the individual tags from the tag supporting means, and to hold such individual tags with respect to tag applying mechanism, and mechanism associated with the tag receiving means for gripping and opening the tag and applying the same to an article to be identified.

Signed at New York city in the county of New York and State of New York this 30th day of July, A. D. 1926.

EDWIN LANE.